US012746987B1

(12) United States Patent
Cymbalist et al.

(10) Patent No.: US 12,746,987 B1
(45) Date of Patent: Sep. 29, 2026

(54) ELECTRIC FAN CAR

(71) Applicant: Tesla, Inc., Austin, TX (US)

(72) Inventors: Niccolo Cymbalist, Los Angeles, CA (US); Thomas James Winser, Redondo Beach, CA (US); Luke Michael Rebbeck, Redondo Beach, CA (US); Andrew Caponetti, Los Angeles, CA (US); Nathaniel Rosenberg, Redondo Beach, CA (US); Daniel Steven Garza, Long Beach, CA (US); Thomas Clarke, Austin, TX (US); James Alexander Morris Tuchel, Los Angeles, CA (US)

(73) Assignee: Tesla, Inc., Austin, TX (US)

( * ) Notice: Subject to any disclaimer, the term of this patent is extended or adjusted under 35 U.S.C. 154(b) by 367 days.

(21) Appl. No.: 18/415,094

(22) Filed: Jan. 17, 2024

Related U.S. Application Data

(60) Provisional application No. 63/439,509, filed on Jan. 17, 2023.

(51) Int. Cl.
*B62D 35/02* (2006.01)
*B62D 35/00* (2006.01)
*B62D 37/02* (2006.01)

(52) U.S. Cl.
CPC ........... *B62D 35/02* (2013.01); *B62D 35/007* (2013.01); *B62D 37/02* (2013.01)

(58) Field of Classification Search
CPC ....... B62D 35/00; B62D 35/007; B62D 35/02
USPC ........................................... 296/180.1, 180.2
See application file for complete search history.

(56) References Cited

U.S. PATENT DOCUMENTS 3,591,229 A * 7/1971 Wilfert ................ B60Q 1/0005 362/293
12,134,427 B2 * 11/2024 Murray .................. B62D 37/02
2021/0245720 A1 * 8/2021 Kava ...................... B62D 37/02
2023/0044790 A1 * 2/2023 Martino ................. B62D 35/02
2023/0399063 A1 * 12/2023 Šotaric ................. B62D 35/007
2024/0092434 A1 * 3/2024 Favaretto ............... B62D 35/02
2024/0286689 A1 * 8/2024 Scholz .................. B62D 35/02

* cited by examiner

*Primary Examiner* — Jason S Daniels
(74) *Attorney, Agent, or Firm* — Schwegman Lundberg & Woessner, P.A.

(57) ABSTRACT

An electric vehicle comprising a ducted fan system configured to increase downforce and reduce drag. The ducted fan system can include a diffuser extending from an input on an underbody of the vehicle and to an outlet on a rear side of the vehicle. The ducted fan system can be connected to a high voltage battery and a control system of the electric vehicle. The electric vehicle can further include a second diffuser to enhance downforce.

15 Claims, 5 Drawing Sheets

ELECTRIC FAN CAR

CROSS-REFERENCE TO RELATED APPLICATIONS

This application claims priority to U.S. Prov. Patent App. No. 63/439,509 titled "ELECTRIC FAN CAR" and filed on Jan. 17, 2023, the disclosure of which is hereby incorporated herein by reference in its entirety.

TECHNICAL FIELD

The present application relates to an electric vehicle design. More particularly, the electric vehicle design employs one or more ducted fans.

BACKGROUND

The achievable speed around corners, and stability during braking, of a road vehicle can often be limited by a measure of downforce, or vertical downward force, available on the vehicle. Downforce can help improve grip around corners and stability during braking. Therefore, a vehicle can achieve increased speed through corners and better stability during deceleration with an improved means of creating downforce.

SUMMARY

The disclosure relates generally to an electric vehicle. More specifically, various embodiments of this disclosure relate to an electric vehicle employing one or more ducted fans.

An aspect is directed to an electric vehicle including a ducted fan system comprising a diffuser and one or more electric ducted fans. The diffuser includes an inlet positioned on an underbody of the vehicle, an outlet positioned on a rear side of the vehicle, and an air pathway extending between the inlet and the outlet. The one or more electric ducted fans are configured to draw air through the inlet and emit air through the outlet.

A variation of the aspect above further comprises a second diffuser.

A variation of the aspect above is, wherein the second diffuser is a raked plate positioned at a rear end of the underbody of the vehicle.

A variation of the aspect above is, wherein the air pathway extends substantially upward from the inlet to the outlet.

A variation of the aspect above is, wherein the one or more ducted fans are connected to a high voltage battery of the vehicle.

A variation of the aspect above is, wherein the one or more ducted fans are connected to a control system of the vehicle.

Another aspect is directed to a system of enhancing downforce in an electric vehicle including a control system, a high voltage battery, and one or more electric ducted fans. The one or more electric ducted fans are connected to the high voltage battery and the control system, wherein the one or more electric ducted fans are positioned inside an air pathway extending from an input on an underbody of the vehicle and to an outlet on a rear side of the vehicle.

A variation of the aspect above is, wherein the control system is configured to control the one or more electric ducted fans based at least in part on detecting a condition.

A variation of the aspect above is, wherein the control system is configured to control the one or more electric ducted fans based at least in part on receiving an input from a user.

BRIEF DESCRIPTION OF THE DRAWINGS

The present disclosure is described with reference to the accompanying drawings, in which like reference characters reference like elements, and wherein.

DETAILED DESCRIPTION

Generally described, one or more aspects of the present disclosure relate to a vehicle (e.g., an electric vehicle). In certain embodiments, this disclosure relates to an electric vehicle employing one or more ducted fans. In some embodiments, a series of electric ducted fans (EDFs) can be integrated into an electric vehicle and/or its power system to provide downforce and thrust for improved grip and stable braking and increased speed around corners. The EDFs may be axial fans (e.g., not centrifugal fans) powered by a same battery which powers movement of the vehicle (e.g., a battery pack). In some embodiments, the EDFs may operate without use of additional elements below the vehicle (e.g., a skirt, such as a skirt which is contact with a road surface). In some embodiments the electric ducted fans may be packaged into a diffuser of the vehicle.

A road vehicle can increase downforce by various means, for example, decreasing pressure underneath the vehicle. Aerodynamic downforce is often created by passive aerodynamic features of a vehicle and is proportional to the vehicle speed. Therefore, passive aerodynamic features (e.g. diffusers) of a vehicle limit the achievable load of downforce at a low speed and often results in an excessive load at a high speed. The electric ducted fans can produce a downforce independent of the vehicle velocity and provide improved stability during braking and increased speed around corners.

Figure 1:
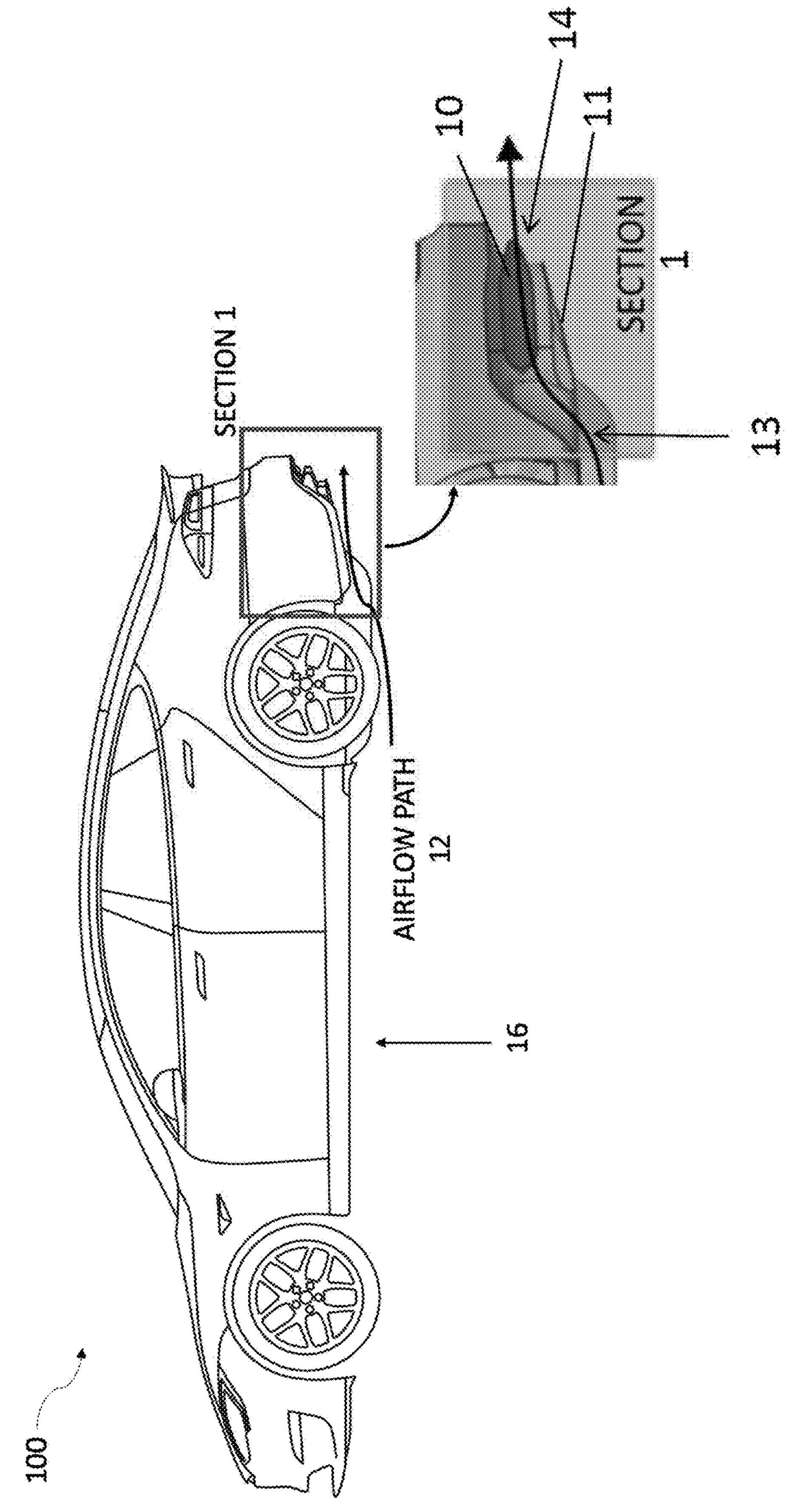
FIG. 1 is a left side view of an electric fan car according to a preferred embodiment of the present disclosure.
Figure 3A:
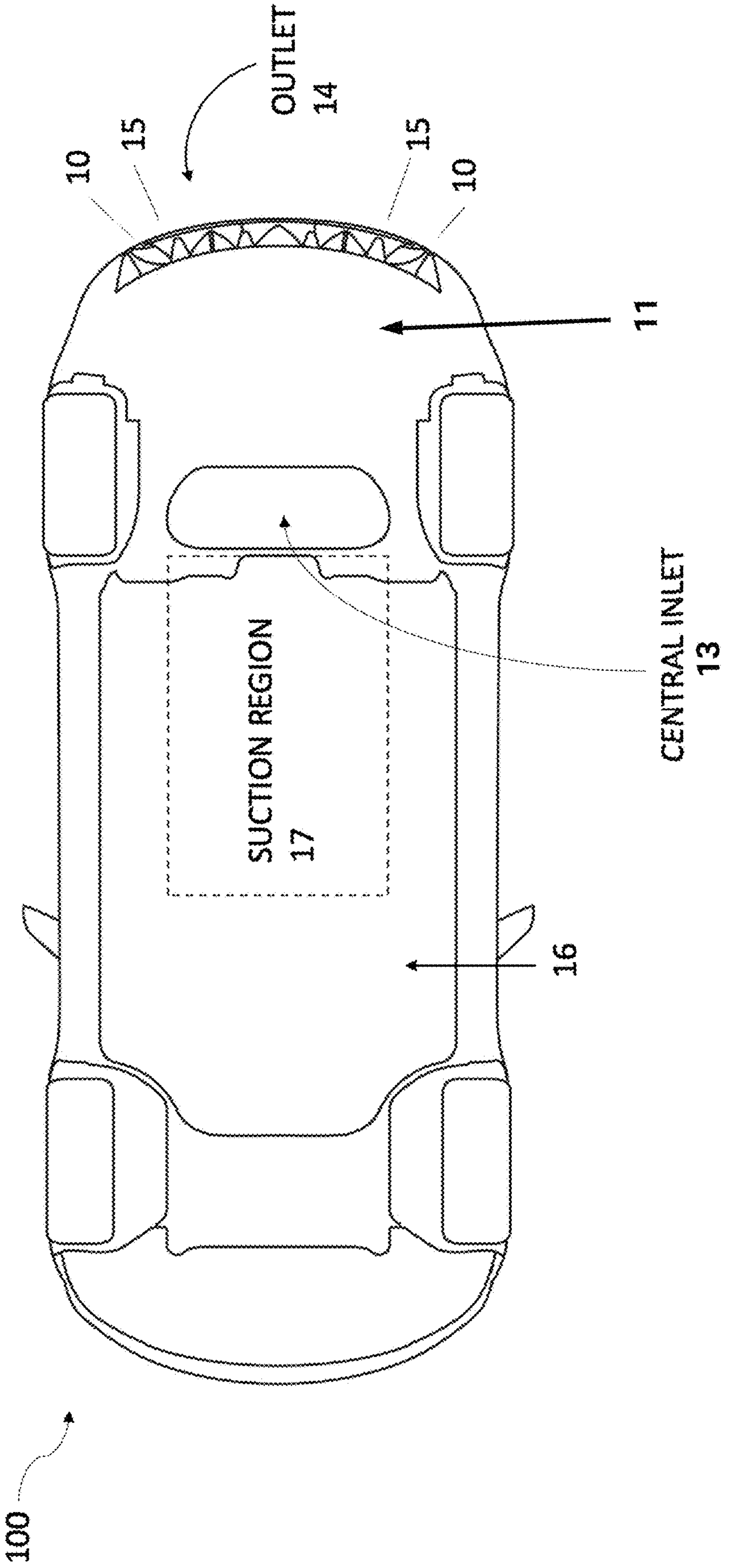
FIG. 3A is an embodiment of a bottom view of the electric fan car of FIG. 1.
Figure 3B:
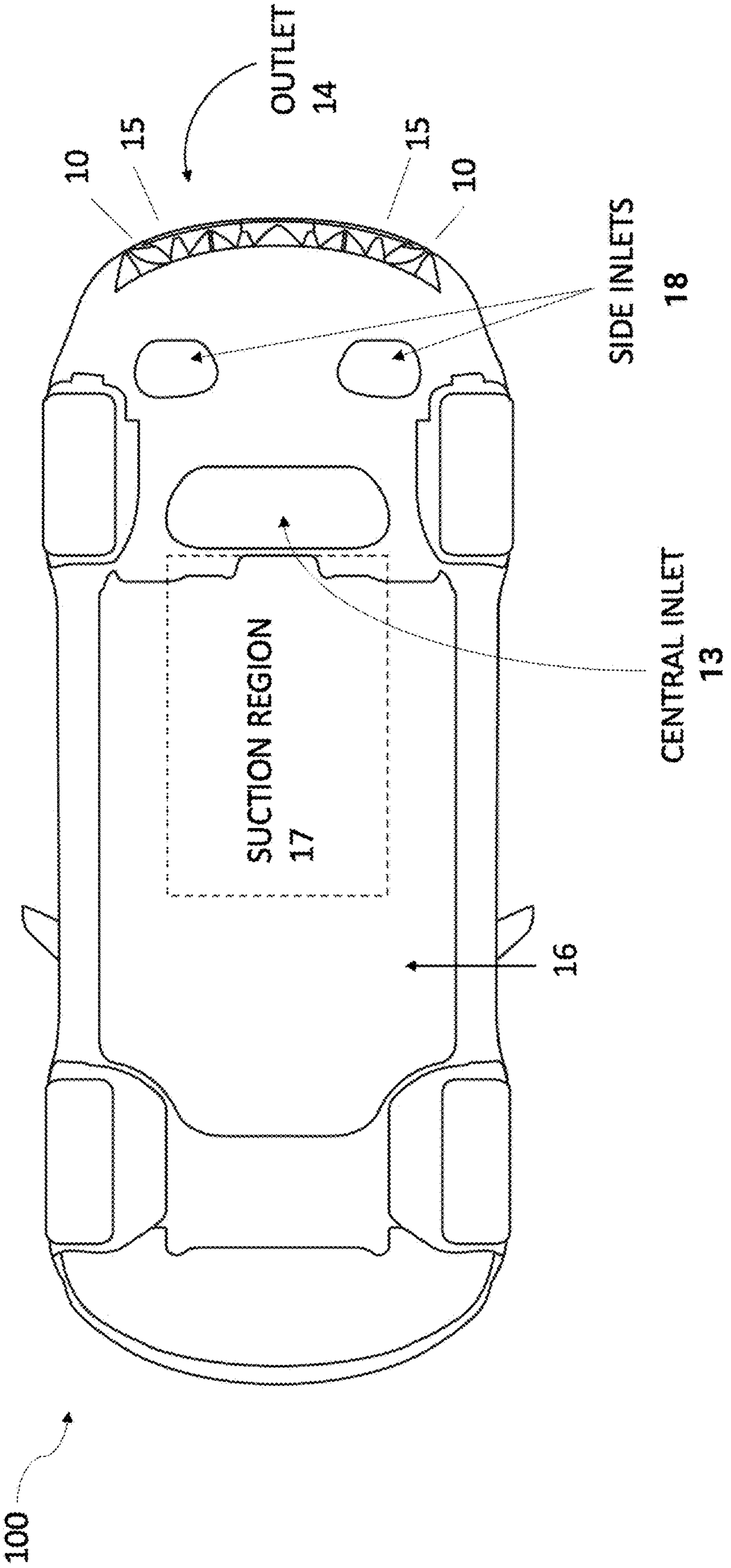
FIG. 3B is another embodiment of a bottom view of the electric fan car of FIG. 1.

As shown in FIG. 1, in some embodiments, an electric vehicle 100 can include a ducted fan system 1 positioned at a rear section of the electric vehicle 100. The ducted fan system 1 can include a first diffuser configured to further enhance downforce and reduce drag. In some embodiments, the first diffuser can include an air pathway 12 extending from an inlet 13 to an outlet 14 as shown in FIG. 1. In some embodiments, a cross-sectional area of the outlet 14 can be larger than a cross-sectional area of the inlet 13. In some embodiments, and as illustrated in FIG. 3B, one or more side inlets (e.g., two side inlets, one on a driver side and one on a passenger side, two on the driver side and two on the passenger side, and so on) may be used. Advantageously, in some embodiments the effectiveness of the fans may not be dependent on angle such that the fans may be adapted to any vehicle's diffuser.

The air pathway 12 can be configured to allow high velocity air under the vehicle to expand and decelerate to a medium velocity. The medium velocity air around the rear section of the vehicle 100 can improve the transition of air velocity between the high velocity air underneath the vehicle 100 and low velocity air in the ambient environment, thereby reducing drag and increasing downforce. Further, air in front of the inlet 13 can have the lowest pressure and form a suction region 17 underneath the vehicle as shown in FIG. 3A.

FIG. 3B illustrates a bottom view of the electric fan car of FIG. 1. In some embodiments, side inlets 18 may be included on the bottom. The side inlets 18, which may be smaller than the central inlet 13 and rearward of the central inlet 13, may reduce or eliminate the tendency of the central inlet 13 to draw air from the rear of the vehicle (e.g., backwash), instead of from the underfloor areas of the vehicle, forward of the inlet, as is its intent. Drawing air from the rear of the vehicle does not contribute to downforce generation and may be detrimental to overall downforce generation as the fans powering the central inlet are instead wasting power on drawing air from the rear of the car. The smaller inlets 18 to the side and rearward of the central inlet 13 generate a low-pressure region rearwards of the central inlet 13, thereby preventing air from flowing from the rear of the car forward to the central inlet 13. The result is that the central inlet draws air only from the underfloor of the car, as intended, thereby generating maximum downforce levels. In some embodiments, the side inlets 18 are connected to the same airflow path 12 as the central inlet. In some embodiments, the side inlets 18 are separate and form their own airflow paths to the fans. For these embodiments, the airflow path 12 associated with central inlet 13 may be in a fluidic path with a subset of the fans (e.g., a middle set, such as the middle 2 of FIG. 2). Each side inlet may then be a fluidic path with its own subset of the fans (e.g., a single fan, such as either the left-most or right-most fan in FIG. 2).

Figure 2:
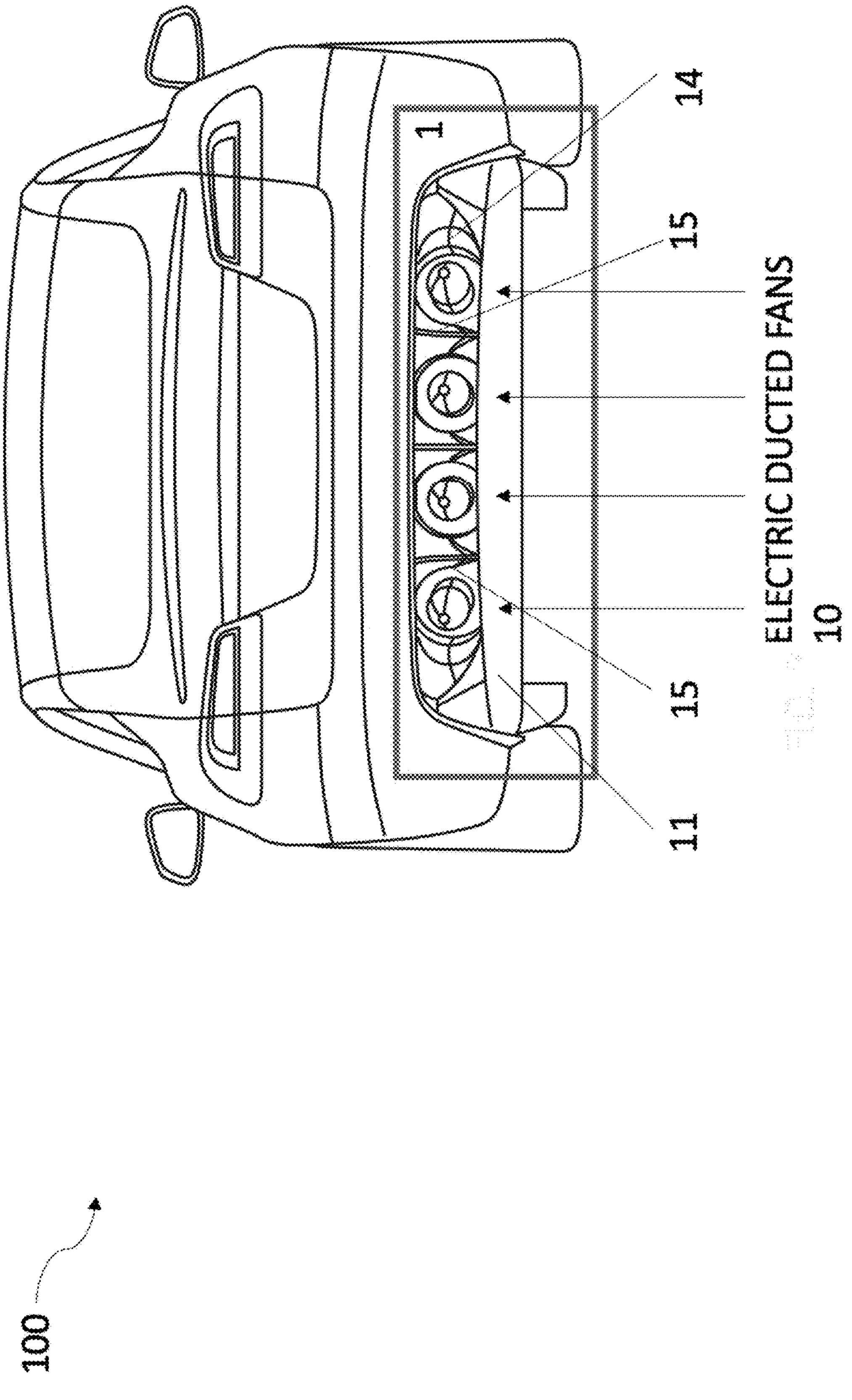
FIG. 2 is a rear view of the electric fan car of FIG. 1.

In some embodiments, the ducted fan system 1 can further include one or more strakes 15 positioned at the outlet 14 as shown in FIG. 2. The one or more strakes 15 can be configured to help control the volume of air flow exiting the air pathway 12. In some embodiments, the one or more strakes 15 may extend vertically between a top side and a bottom side of the outlet 14.

In accordance with various embodiments of this disclosure, the ducted fan system 1 can also include one or more electric ducted fans 10 as shown in FIGS. 1-3B. In some embodiments, four electric ducted fans may be used. In some embodiments, 2, 3, 5, 6, and so on, electric ducted fans may be used. The electric ducted fans 10 can be configured to draw air in the air pathway 12 and emit the air to the ambient environment (e.g., out of a rear of the vehicle). In this way, the air may be accelerated underneath the electric vehicle 100. The electric ducted fans 10 can accelerate and/or facilitate air flow independent of the velocity of the electric vehicle 100, thereby reducing drag and increasing downforce of the electric vehicle 100 at any speed. In some embodiments, individual electric ducted fans 10 can be positioned on either side of individual strakes 15 of the ducted fan system 1. For example, as shown in FIG. 2, the ducted fan system 1 can include three strakes 15 and four electric ducted fans 10 positioned side-by-side at the outlet 14.

In various embodiments, the electric vehicle 100 can include a second diffuser configured to enhance downforce and reduce drag. In some embodiments, the second diffuser can be formed of a raked plate 11 positioned at a rear end of an underbody 16 of the electric vehicle 100. The raked plate 11 can be configured to similarly allow high velocity air under the vehicle to expand and decelerate. The transition of air velocity between the high velocity air underneath the vehicle and low velocity air in the ambient environment increases downforce.

Another embodiment of an electric fan car according to this disclosure can include a diffuser having an air pathway angled upward and an outlet positioned higher up such that air flow exiting the diffuser may be directed in an upward direction. The higher-positioned air outlet can create an air high pressure zone near an upper surface of the vehicle 100 in addition to creating an air low pressure zone under the vehicle 100, thereby further increasing downforce on the vehicle 100.

Figure 4:
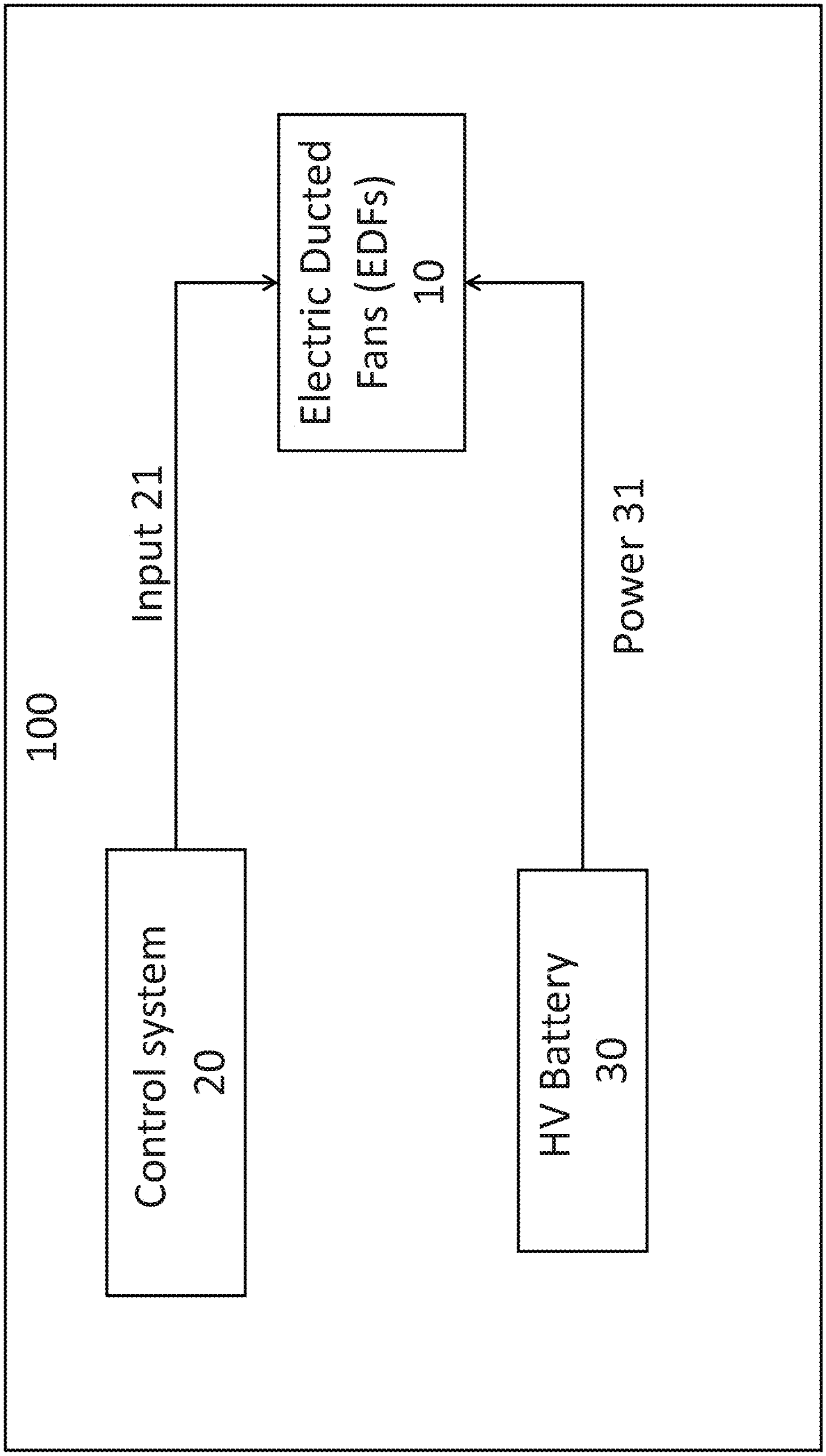
FIG. 4 is a block diagram illustrating how one or more electric ducted fans are integrated into the electric fan car of FIG. 1.

Further, an electric fan car according to this disclosure can include a ducted fan system 1 integrated into the electric vehicle 100 with minimal visual intrusion and limitation on the vehicle's functionality. For example, the ducted fan system 1 may not require additional gearing from an engine or an additional power source dedicated to the EDFs. In some embodiments, the EDFs are connected directly to the high voltage (HV) battery 30 of the electric vehicle 100 for receiving power 31 and to enable a compact and integrated system execution. For example, in some embodiments, the electric ducted fans 10 may be connected directly to the HV battery 30 of the electric vehicle 100 as shown in FIG. 4.

Another aspect of this disclosure is the integration of the ducted fan system 1 with a control system of the electric vehicle 100 (e.g., a control system of one or more processors). The integration of the ducted fan system 1 with the control system enables active stability and performance control based on handling requirements. For example, in some embodiments, the electric ducted fans 10 may be connected to the control system 20 of the electric vehicle 100 as shown in FIG. 4. The ducted fan system 1 can therefore respond quickly to an input 21 from the driver or the control system 20. For example, in some embodiments, a driver can simply push a button to enable the electric ducted fans 10. In certain embodiments, the electric fan car can include a control system 20 that will prompt the user to or automatically turn on the electric ducted fans 10 based on detecting certain parameters and/or achieving certain predetermined conditions (e.g., a threshold velocity, within a range of velocities, below a threshold velocity, and so on).

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed electric ducted fan system. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including," "comprising," "incorporating," "consisting of," "have," "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first," "second," "third," "primary," "secondary," "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. An electric vehicle comprising:

a ducted fan system comprising a diffuser and one or more electric ducted fans, wherein the diffuser comprises an inlet positioned on an underbody of the vehicle, an outlet positioned on a rear side of the vehicle, and an air pathway extending between the inlet and the outlet, wherein a cross-sectional area of the outlet is larger than a cross-sectional area of the inlet;

one or more strakes positioned at the outlet, the one or more strakes extending vertically between a top side and a bottom side of the outlet and being disposed between adjacent electric ducted fans from among the one or more electric ducted fans; and wherein the one or more electric ducted fans are configured to draw air through the inlet and emit air through the outlet.

2. The electric vehicle of claim 1, further comprising a second diffuser.

3. The electric vehicle of claim 2, wherein the second diffuser is a raked plate positioned at a rear end of the underbody of the vehicle.

4. The electric vehicle of claim 1, wherein the air pathway extends substantially upward from the inlet to the outlet.

5. The electric vehicle of claim 1, wherein the one or more ducted fans are connected to a high voltage battery of the vehicle.

6. The electric vehicle of claim 1, wherein the one or more ducted fans are connected to a control system of the vehicle.

7. A system of enhancing downforce in an electric vehicle comprising:

a control system;

a high voltage battery; and one or more electric ducted fans connected to the high voltage battery and the control system, wherein the one or more electric ducted fans are positioned inside an air pathway extending from an inlet on an underbody of the vehicle and to an outlet on a rear side of the vehicle, the outlet having a cross-sectional area larger than a cross-sectional area of the inlet;

one or more strakes positioned at the outlet, the one or more strakes extending vertically between a top side and a bottom side of the outlet, each strake being disposed between adjacent electric ducted fans, and wherein the one or more electric ducted fans draw air through the inlet to the outlet.

8. The system of claim 7, wherein the control system is configured to control the one or more electric ducted fans based at least in part on detecting a condition.

9. The system of claim 7, wherein the control system is configured to control the one or more electric ducted fans based at least in part on receiving an input from a user.

10. An electric vehicle comprising:

a ducted fan system comprising a diffuser and one or more electric ducted fans, the one or more electric ducted fans being axial fans and powered by a high voltage battery which powers movement of the electric vehicle, wherein the diffuser comprises an inlet positioned on an underbody of the vehicle, a plurality of side inlets positioned rearward of the inlet, an outlet positioned on a rear side of the vehicle, and an air pathway extending at least between the inlet and the outlet, the outlet having a cross-sectional area larger than a cross-sectional area of the inlet;

one or more strakes positioned at the outlet, the one or more strakes extending vertically between a top side and a bottom side of the outlet, each strake being disposed between adjacent electric ducted fans from the one or more electric ducted fans; and wherein the one or more electric ducted fans are configured to draw air through the inlet and emit air through the outlet.

11. The electric vehicle of claim 10, wherein the side inlets include a first side inlet on a driver side of the electric vehicle and a second side inlet on a passenger side of the electric vehicle.

12. The electric vehicle of claim 10, wherein the air pathway extends between the inlet, the side inlets, and the outlet.

13. The electric vehicle of claim 10, wherein the air pathway extends substantially upward from the inlet to the outlet.

14. The electric vehicle of claim 10, wherein additional air pathways extend between the side inlets and the outlet.

15. The electric vehicle of claim 10, wherein the one or more electric ducted fans are connected to a control system of the electric vehicle.

* * * * *